US 8,725,492 B2

(12) United States Patent
Odell et al.

(10) Patent No.: US 8,725,492 B2
(45) Date of Patent: May 13, 2014

(54) RECOGNIZING MULTIPLE SEMANTIC ITEMS FROM SINGLE UTTERANCE

(75) Inventors: Julian J Odell, Kirkland, WA (US); Robert L. Chambers, Sammamish, WA (US); Oliver Scholz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1258 days.

(21) Appl. No.: 12/042,460

(22) Filed: Mar. 5, 2008

(65) Prior Publication Data

US 2009/0228270 A1 Sep. 10, 2009

(51) Int. Cl.
*G06F 17/28* (2006.01)

(52) U.S. Cl.
USPC ............. 704/9; 704/251; 704/257; 704/275

(58) Field of Classification Search
CPC ...... G10L 15/22; G10L 15/265; G10L 15/183
USPC .................... 704/9, 251, 257, 275
See application file for complete search history.

(56) References Cited

U.S. PATENT DOCUMENTS

| | | | |
|---|---|---|---|
| 5,479,488 A | 12/1995 | Lennig et al. ................ 379/67 |
| 5,737,724 A | 4/1998 | Atal et al. .................... 104/251 |
| 5,960,397 A | 9/1999 | Rahim |
| 6,073,096 A | 6/2000 | Gao et al. |
| 6,122,361 A | 9/2000 | Gupta ........................ 379/223 |
| 6,182,037 B1 | 1/2001 | Maes |
| 6,751,595 B2 | 6/2004 | Busayapongchai et al. .. 704/275 |
| 6,757,652 B1 | 6/2004 | Lund et al. |
| 6,868,381 B1 | 3/2005 | Peters et al. |
| 6,973,429 B2 | 12/2005 | Smith ........................ 704/257 |
| 6,996,519 B2 | 2/2006 | Franco et al. ................... 704/9 |
| 7,006,971 B1 | 2/2006 | Stahl et al. .................. 704/242 |
| 7,184,957 B2 | 2/2007 | Brookes et al. |
| 7,216,077 B1 | 5/2007 | Padmanabhan et al. |
| 7,308,404 B2 | 12/2007 | Venkataraman et al. |
| 7,401,017 B2 | 7/2008 | Murveit et al. |
| 7,567,903 B1 | 7/2009 | Goffin et al. |
| 8,386,251 B2 | 2/2013 | Strom et al. |
| 2002/0087314 A1 | 7/2002 | Fischer et al. |
| 2002/0138265 A1* | 9/2002 | Stevens et al. ............... 704/251 |
| 2004/0199393 A1 | 10/2004 | Arizmendi et al. |
| 2005/0234723 A1* | 10/2005 | Arnold et al. ................ 704/257 |
| 2005/0240409 A1 | 10/2005 | Gallistel ...................... 704/270 |
| 2006/0206333 A1 | 9/2006 | Paek et al. |
| 2006/0259294 A1 | 11/2006 | Tashereau ..................... 704/10 |
| 2007/0124057 A1* | 5/2007 | Prieto et al. .................. 701/200 |

(Continued)

OTHER PUBLICATIONS

Automatic Acquisition of Names Using Speak and Spell Mode in Spoken Dialogue Systems http://people.csail.mit.edu/seneff/hlt-2003.pdf.

(Continued)

*Primary Examiner* — Vincent P Harper
(74) *Attorney, Agent, or Firm* — Steve Spellman; Jim Ross; Micky Minhas

(57) ABSTRACT

Semantically distinct items are extracted from a single utterance by repeatedly recognizing the same utterance using constraints provided by semantic items already recognized. User feedback for selection or correction of partially recognized utterance may be used in a hierarchical, multi-modal, or single step manner. An accuracy of recognition is preserved while the less structured and more natural single utterance recognition form is allowed to be used.

17 Claims, 6 Drawing Sheets

(56) References Cited

U.S. PATENT DOCUMENTS

| | | | |
|---|---|---|---|
| 2007/0225970 A1 | 9/2007 | Kady et al. | 704/10 |
| 2008/0082334 A1 | 4/2008 | Watson | |
| 2008/0120091 A1 | 5/2008 | Waibel et al. | |
| 2008/0147399 A1* | 6/2008 | Jaiswal et al. | 704/251 |
| 2008/0189106 A1* | 8/2008 | Low et al. | 704/231 |
| 2008/0208577 A1 | 8/2008 | Jeong et al. | |
| 2010/0076757 A1 | 3/2010 | Li et al. | |
| 2010/0312557 A1 | 12/2010 | Strom et al. | |

OTHER PUBLICATIONS

A—Admissible Key-Phrase Spotting with Sub-Syllable Level Utterance Verification http://wkd.iis.sinica.edu.tw/~lfchien/publication/iscslp98.pdf.

Improving Speech Recognition Using Semantic and Reference Features in a Multimodal Dialog System http://isoft.postech.ac.kr/publication/iconf/roman07_kim(b).pdf.

Srinivasmurthy et al., Efficient Scalable Encoding for Distributed Speech Recognition, Retrieved at <<http://citeseerx.ist.psu.edu/viewdoc/download?doi=10.1.1.107.4383&rep=rep1&type=pdf>>, Speech Communication 48, 2006, pp. 888-902.

Pellom et al., Recent Improvements in the CU Sonic ASR System for Noisy Speech: the Spine Task, 2003, Retrieved at <<http://www.inf.ed.ac.uldresources/nlp/local_doc/sonic-icassp2003-pub1.pdf>>, 4 pages.

Vogt et al., "Improving Automatic Emotion Recognition from Speech via Gender Differentiation," 2006, Retrieved at <<http://mm.werkstatt.informatik.uni-augsburg.de/files/publications/124/Irec06.pdf>>, 4 pages.

Woodland et al., "Iterative Unsupervised Adaptation Using Maximum Likelihood Linear Regression," 1996, Retreived at <<ftp://syrftp.eng.cam.ac.uk/pub/reports/woodland_icslp96.pdf>>, 4 pages.

Chen et al., Automatic Accent Identification Using Gaussian Mixture Models, 2001, Retrieved at <<http://www.google.com/url?sa=t&source=web&ct=res&cd=1&url=http%3A%2F%2Fanthony.t.chen.googlepages.com%2Ftchen01-asru.pdf&ei=S1HwSfD-HYzMjAfhu63WDA&usg=AFQjCNHk1OzGe9xlvbjHyXoloinptpyGXQ>>, 4 pages.

Potamianos et al."Automatic Speech Recognition in CHIL," Retrieved at <<http://domino.research.ibm.com/comm/research_people.nsf/pages/gerasimos.potamianos.pubs.html/$FILE/J.CHIL08.ASR.pdf>>, 18 pages.

* cited by examiner

RECOGNIZING MULTIPLE SEMANTIC ITEMS FROM SINGLE UTTERANCE

BACKGROUND

One of the forefronts of computing technology is speech recognition, because people often find speech to be familiar and convenient way to communicate information. With computerized applications controlling many aspects of daily activities from word processing to controlling appliances, providing speech recognition based interfaces for such applications is a high priority of research and development for many companies. Even web site operators and other content providers are deploying voice driven interfaces for allowing users to browse their content. The voice interfaces commonly include "grammars" that define valid utterances (words, terms, phrases, etc.) that can occur at a given state within an application's execution. The grammars are fed to a speech recognition system and used to interpret the user's voice entry.

Conventional voice response systems often make use of a rigidly structured series of questions to extract multiple pieces of information. For example, directory assistance applications typically ask for (and may confirm) the city and state for a listing before asking for the name of the listing requested. Such rigid structures mean that more interactions are required with the user. In cases where there may be some significant latency—for example communication with a speech recognition/search application over a cellular data network may have latencies of many seconds—these extra turns are undesirable.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to extraction of semantically distinct items from a single utterance. An accuracy of the structured speech recognitions approach is preserved by repeatedly recognizing the same utterance using constraints provided by semantic items already recognized, while allowing the less structured single utterance recognition form.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly discussed above, semantically distinct items may be extracted from a single utterance in a speech recognition system by repeatedly recognizing the same utterance using constraints provided by semantic items already recognized. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

While the term "call" is mainly used in examples throughout this document as referring to voice communications, it is not so limited. "Call" may also be used in reference to video communications, conference communications, instant messaging, and other forms of communication discussed herein in conjunction with estimating endpoint performance.

Figure 1:
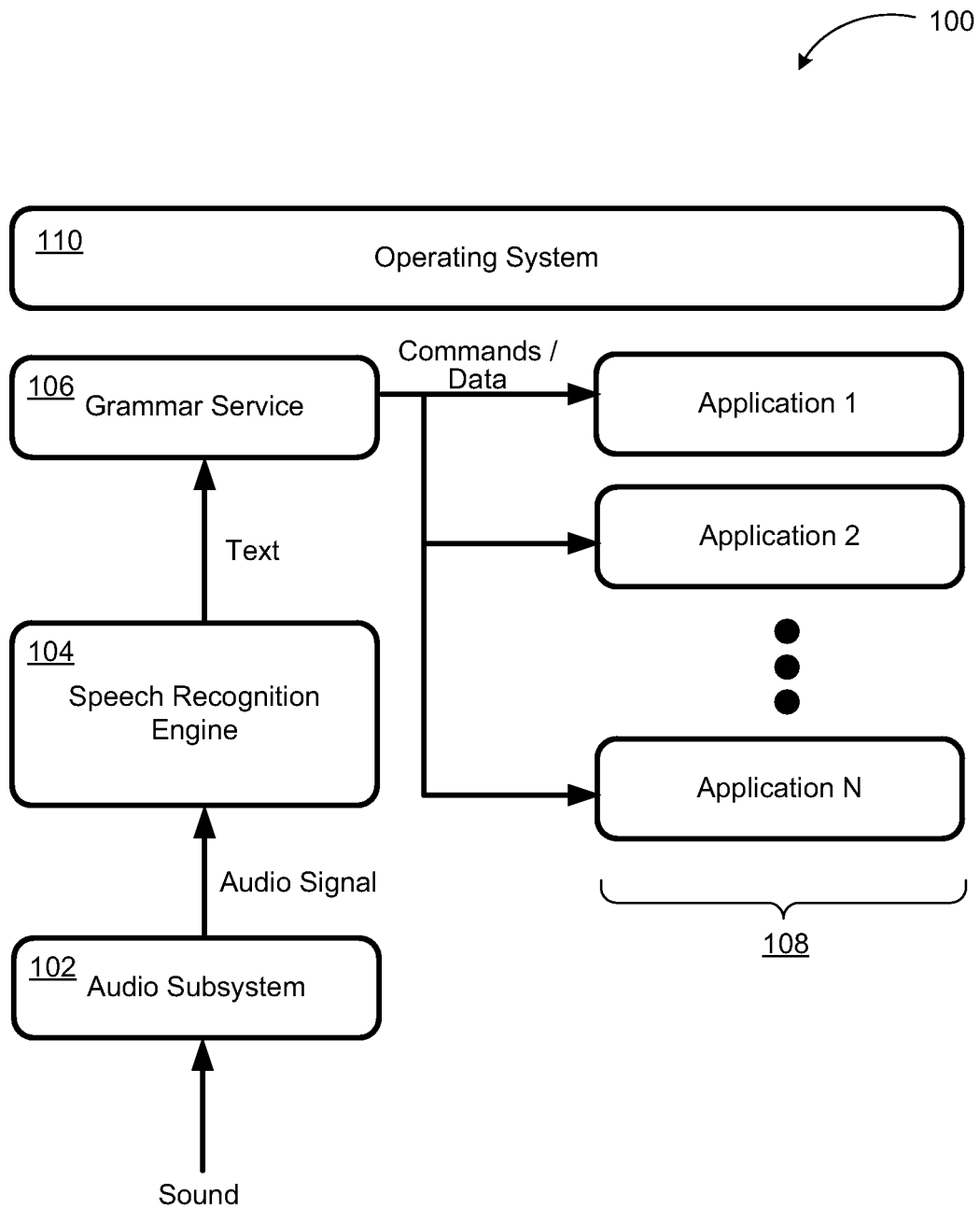
FIG. 1 illustrates a conceptual diagram of processes and sub-processes of an implementation of a speech recognition system.

Referring to FIG. 1, diagram 100 of processes and sub-processes of an implementation of a speech recognition system is illustrated. In the example system, audio subsystem 102 begins the process of speech recognition by converting sound input to audio signals. This block is typically implemented as signal processors that are well known in the art. The audio signal is provided to speech recognition engine 104, which converts the audio signal to textual data.

Speech engine 104 may comprise a number of components such as a language modeling module, a training module, a language model customization module, and the like. Speech recognition engine 104 recognizes words, phrases, and the like, based on customized language and acoustic models and provides textual versions of the audio utterances. A speech recognition engine according to embodiments, extracts semantically distinct items within a single utterance by repeatedly recognizing the same utterance using constraints provided by semantic items already recognized in previous recognitions of the same utterance.

Grammar service 106 may perform the task of managing recognized text before it is provided to one or more applications such as application 1 through N (108). As shown in the figure, multiple applications may consume the recognized text. The consumption of the recognized audio and the recognition processes may be an interactive one, according to some embodiments, where user feedback for selection or correction of a recognized portion of the utterance is received before the entire utterance is recognized and consumed by the application(s) 108.

Applications 1 through N (108) represent any speech enabled application including, but not limited to, word processing applications, presentation applications, browsing applications, navigational assistance applications, communication applications, and the like. Operating system 110 provides a framework for the different components of the speech recognizing system to work within. While the illustration shows all components and the applications under one operating system, various portions of the architecture may be executed in different operating systems.

Components of the speech recognizing system such as grammar service 106 may be loaded into a server, executed over a distributed network, executed in a client device, and the like. Furthermore, the components described above are for illustration purposes only, and do not constitute a limitation on the embodiments. A speech recognizing system with multiple semantic item recognition from a single utterance may be implemented using fewer or additional components in various orders. Individual components may be separate applications, or part of a single application. The speech recognition system or its components may include individually or collectively a user interface such as a web service, a Graphical User Interface (GUI), and the like.

Figure 2:
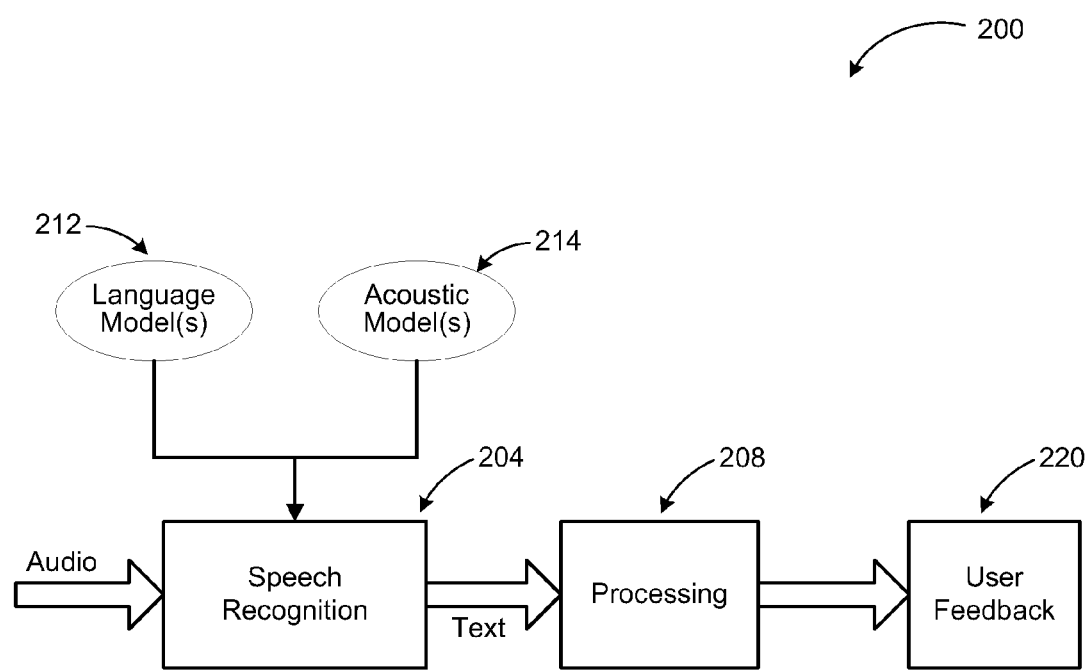
FIG. 2 illustrates another diagram of speech recognition process using language and acoustic models for feeding the recognized audio to an application for processing and subsequent user feedback.

FIG. 2 illustrates diagram 200 of speech recognition process using language and acoustic models for feeding the recognized audio to an application for processing and subsequent user feedback. Example implementations of such a process include, but are not limited to, search engine user interfaces, directory assistance user interfaces, and so on, where the user interface may provide visual (through a display) or auditory (through a speaker) user feedback.

As mentioned before, speech recognition process 204 takes in audio input and provides textual output. In recognizing utterances, a speech recognition engine may utilize a language model 212 and an acoustic model 214. The language model may be generated and/or adapted through statistical modeling of words, phrases, fragments, etc. that form a user's profile. Statistical data from user language model statistics and a generic language model may be used in generating the adapted language model customized for the particular user's profile.

The acoustic model 214 may be based on live or stored audio recording(s) by the user, which are used for generating statistics data to adapt a generic acoustic model to the customized acoustic model. The acoustic and language models are then used by the speech recognition process 204 to generate textual data/commands for processing (208) by other applications.

The other applications according to some embodiments include user interfaces configured to provide feedback to the user based on the recognized audio input. For example, a browser application may receive recognized speech input for searching items on the Internet and displaying the results in user feedback process 220. User feedback 220 may be audio, visual, or in another form depending on the application type.

The above described components, modules, and processes are for example purposes and do not constitute a limitation on embodiments. Recognizing semantically distinct items from a single utterance may be implemented in other ways or using other configurations using the principles described herein by recognizing the same utterance multiple times and using constraints generated as a result of one recognition step in narrowing the results for a subsequent recognition step.

Figure 3:
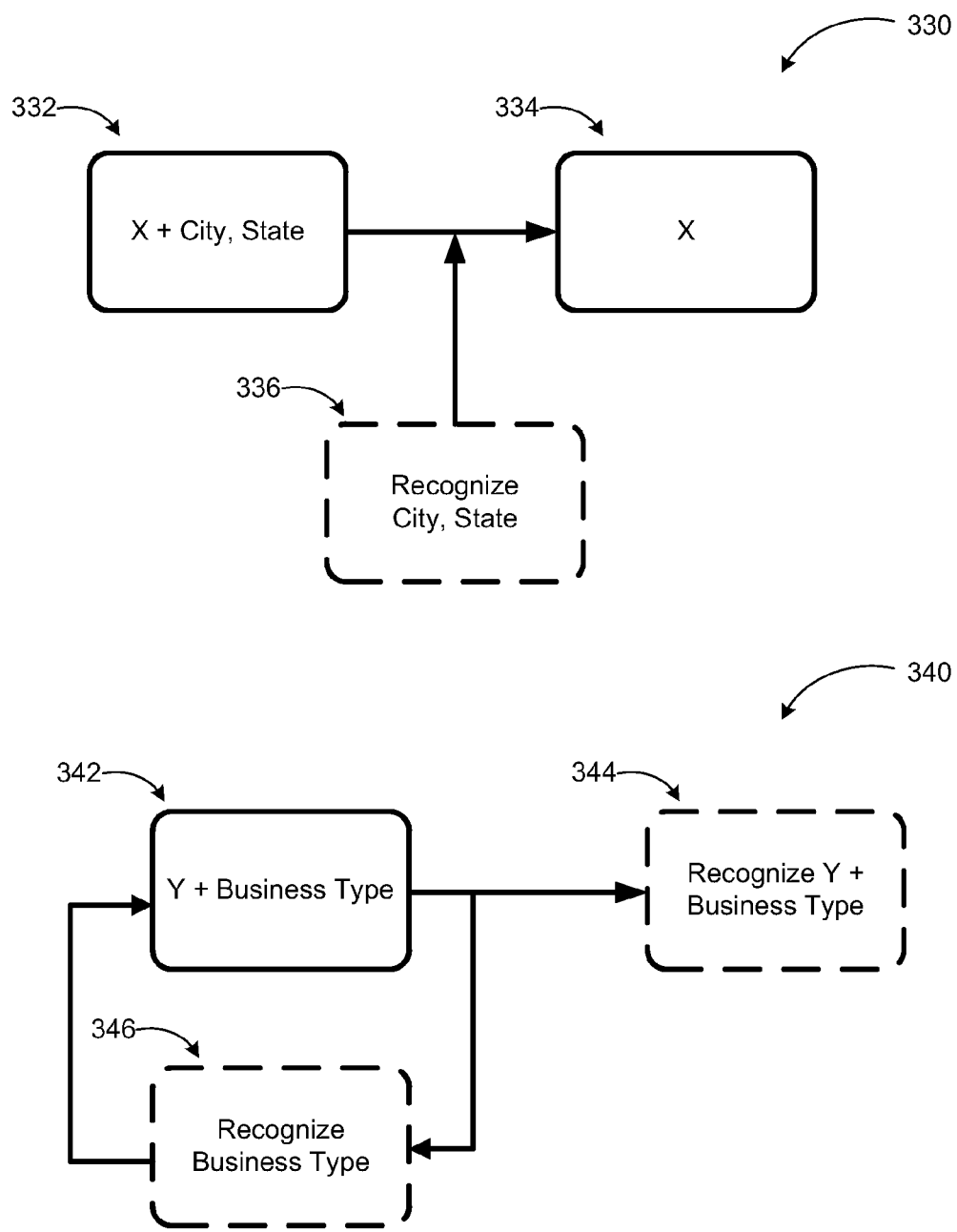
FIG. 3 is a conceptual diagram, illustrating two example embodiments implementing recognition of semantically distinct items from a single utterance.

FIG. 3 is a conceptual diagram, illustrating two example embodiments implementing recognition of semantically distinct items from a single utterance. Allowing the user to combine multiple items of information into a single utterance can be more natural and quicker—if the recognition accuracy can be maintained. There are, however, challenges associated with this. One possible solution may be to use a single generic grammar for each of the items to be recognized, such as building a single grammar by following a generic first portion grammar with a generic second portion grammar for the utterance. However, this may result in a reduction of accuracy due to the use of the generic grammar where the structured dialog could use a specific one.

Embodiments enable constraints derived from recognition of a portion of the utterance to be applied to another portion of the same utterance by using repeated recognitions. Although a single utterance provides multiple semantic items in a system according to embodiments, the confirmation of that information may still take multiple steps. The confirmation may be performed through audio, visual, or another form of user input in a multimodal, hierarchical, or single step experience presenting the user with an opportunity to correct or select among options resulting from the recognition of the first portion, which is then fed back into the recognition of the second portion of the utterance.

First example implementation, illustrated in diagram 330, represents a directory assistance operation based on a person uttering the name of a business followed by the city and state where the business is located (332). A first recognition determines the city and state (336), which is used to select the appropriate grammar for the second recognition determining the business name (334). In this example case, the knowledge of the city may be used to choose a locale specific grammar that is then used to recognize the business name. That locale specific grammar may typically perform more accurately than a generic grammar that must recognize business names without knowledge of the locale. For example, "Moe" and "Joe" are highly confusable names with "Joe" being significantly more popular. But knowledge of the locality "Springfield" means that "Moe's Tavern" may be much more likely than "Joe's Tavern".

It should be noted that the term "grammar" refers to not just constrained context free type models that list each phrase to be listened for but also statistical models with a more open vocabulary that are often referred to as statistical language models.

Referring back to the example implementation diagram 330, the utterance is first recognized using the generic business name plus generic location grammar. From this result possible locations are extracted and the same utterance (or a part thereof) then recognized again using locale specific grammar for the business name. This preserves the accuracy of locale specific grammars at the expense of multiple recognitions against the same utterance.

According to another embodiment, multiple recognitions each using a different location grammar may be used to generate alternates if multiple possible locations are recognized. Coupled with a multi-modal confirmation, this process may present the user the possible locations, which they can correct or confirm. Once the location is confirmed only results specific to that locale may be considered—either by deferring the next recognition of the initial utterance until the location is confirmed or by only displaying the results from that locale's recognition. Such structured dialogs have the advantage that as progress is made through the series of questions, constraints can be used to ensure best recognition of subsequent answers.

Diagram 340 illustrates a second example implementation, where an utterance containing business name and type (342) is first recognized to obtain the business type (346). Based on the constraints derived from this first pass, a specific grammar for the recognized (and confirmed) business type may be utilized to recognize the utterance again, this time extracting the business name (344).

A practical implementation of embodiments, where the advantages become more visible are wireless mobile devices such as smart phones with browsing capabilities. While browsers on such devices can be used for search engine, directory assistance, navigational assistance capabilities, and the like, it may be cumbersome for a user to type in all the information on a small keypad, especially if they are distracted by other activities such as driving. On the other hand, a mobile device with good speech recognition capabilities may be a useful assistant with above listed and other functionalities. However, given the latencies in cellular networks and relatively low available bandwidths, it would be advantageous for the user to be able to say "Joe's Tavern in Redmond Washington" rather than having to first say and confirm the location then say and confirm the business name. In a device according to embodiments, the location is first confirmed (or corrected) by the user before business name results (specific to that confirmed location) are displayed. The time taken by the user to first confirm the location masks the time taken to recognize the first utterance repeated times and send the alternative business names to the client. The delay may also be used to start the search query so that once the user has confirmed the business name the search results are frequently already available on the mobile device for display.

Thus, multiple semantic items may be recognized from a single utterance such as "Joe's Tavern in Seattle, Washington" according to one embodiment. According to another embodiment, relationships between semantic items may be used together with a hierarchy of items to constrain available values for items lower in the hierarchy (e.g. the location "Seattle, Washington" is used to constrain the business names searched to just those in Seattle Wash.). According to a further embodiment, the data is reprocessed to reflect constraints from items recognized in the first pass such as loading the Seattle, Wash. grammar and recognizing the business name from that locale dependent grammar. According to yet another embodiment, the data may be reprocessed to reflect alternatives recognized from the first pass. For example, if the first recognition yielded an alternative in Renton, Wash., the Renton grammar may also be used to recognize the business name.

The reprocessing for different alternates and different semantic items may happen simultaneously. For example "Joe's Tavern on Broadway in Seattle Wash." may be recognized first to determine the likely city. Then, the address and business name may be determined simultaneously with two more recognition passes. Furthermore, confirmation of recognition results may take the form of a hierarchy (e.g. "Were you looking for a business in Redmond Wash.", a multi-modal interface (e.g. "Redmond, Wash. or Renton, Wash."), a single step (e.g. "Did you want the listing for Joe's Tavern, Redmond Wash."), or a visual menu choice (e.g. "Moe's Pancake House, Redmond, Wash. or Joe's Pancake House, Renton, Wash.").

The operations, scenarios, as well as example recognitions, described in FIG. 2 and 3 are exemplary for illustration purposes. A speech recognition and application system according to embodiments may be implemented using additional or fewer components and other schemes using the principles described herein.

Figure 4:
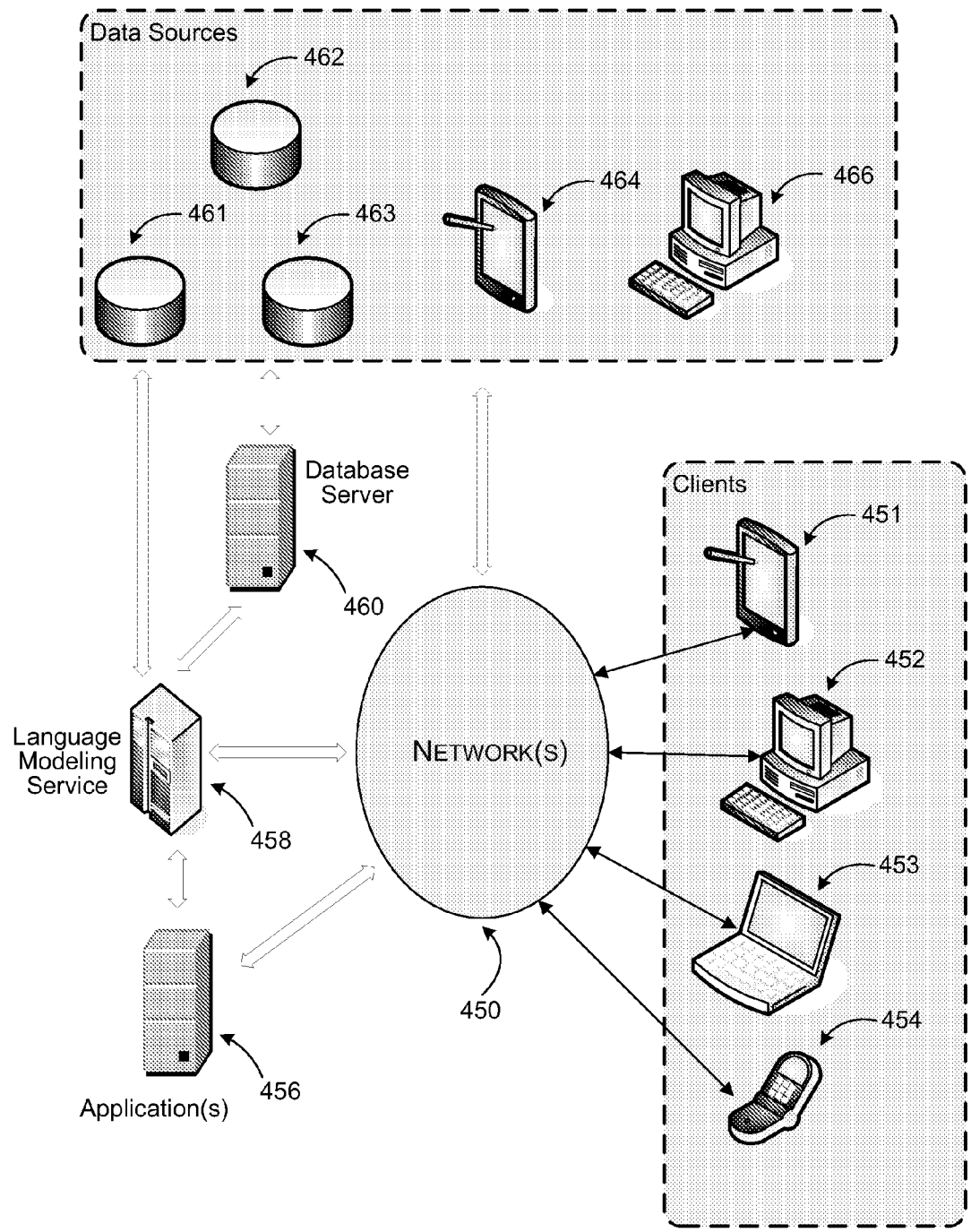
FIG. 4 illustrates a networked environment where embodiments may be implemented.

FIG. 4 is an example networked environment, where embodiments may be implemented. Recognizing semantically distinct items from a single utterance as described previously may be implemented locally or in a distributed manner over a number of physical and virtual clients and servers. Such a system may typically involve one or more networks such as Network(s) 450. At least one of the systems may be implemented in un-clustered systems or clustered systems employing a number of nodes communicating over one or more networks.

A system according to embodiments may comprise any topology of servers, clients, Internet service providers, and communication media. Also, the system may have a static or dynamic topology. The term "client" may refer to a client application or a client device. A system according to embodiments may involve many more components, typical and relevant ones are discussed in conjunction with this figure.

A speech recognition based system may be run on a server or a client machine connected to network(s) 450 and convert audio (voice) input to textual data or commands. Such a speech recognition service may use a generic language model and data for customizing the language model from data sources 461-463, 464, and 466 directly or through database server 460. The data sources may include data stores where generic language models and other customization data may be stored or user devices for providing direct input such as audio training data in speech recognition system. The data sources may also be used for retrieving data associated with other applications utilizing the recognized speech such as a search engine application or a directory service application executed on application server 456. The data sources may include SQL servers, databases, non multi-dimensional data sources, file compilations, data cubes, and the like. Database server 460 may manage the data sources.

Based on repeatedly recognizing semantically distinct items in a single utterance and feedback from the user, the speech recognition service is configured to provide applications on client devices 451-454 or application server 456 textual data and/or commands. Users may interact with the speech recognition service and/or application servers 456 from client devices 451-454 over network(s) 450. In some embodiments, users may run applications that consume the recognized data/commands provided by the speech recognition service in the individual client devices (or applications). In other embodiments, such applications may be controlled by application server 456 and interface with the users' client devices 451-454 over network(s) 450.

Network(s) 450 provides communication between the nodes described herein. By way of example, and not limitation, Network(s) 450 may include wired media such as a wired network or direct-wired connection, and wireless media such as acoustic, RF, infrared and other wireless media.

Many other configurations of computing devices, applications, data sources, data distribution systems may be employed to implement recognition of multiple semantic items from a single utterance. Furthermore, the networked environments discussed in FIG. 4 are for illustration purposes only. Embodiments are not limited to the example applications, modules, or processes.

Figure 5:
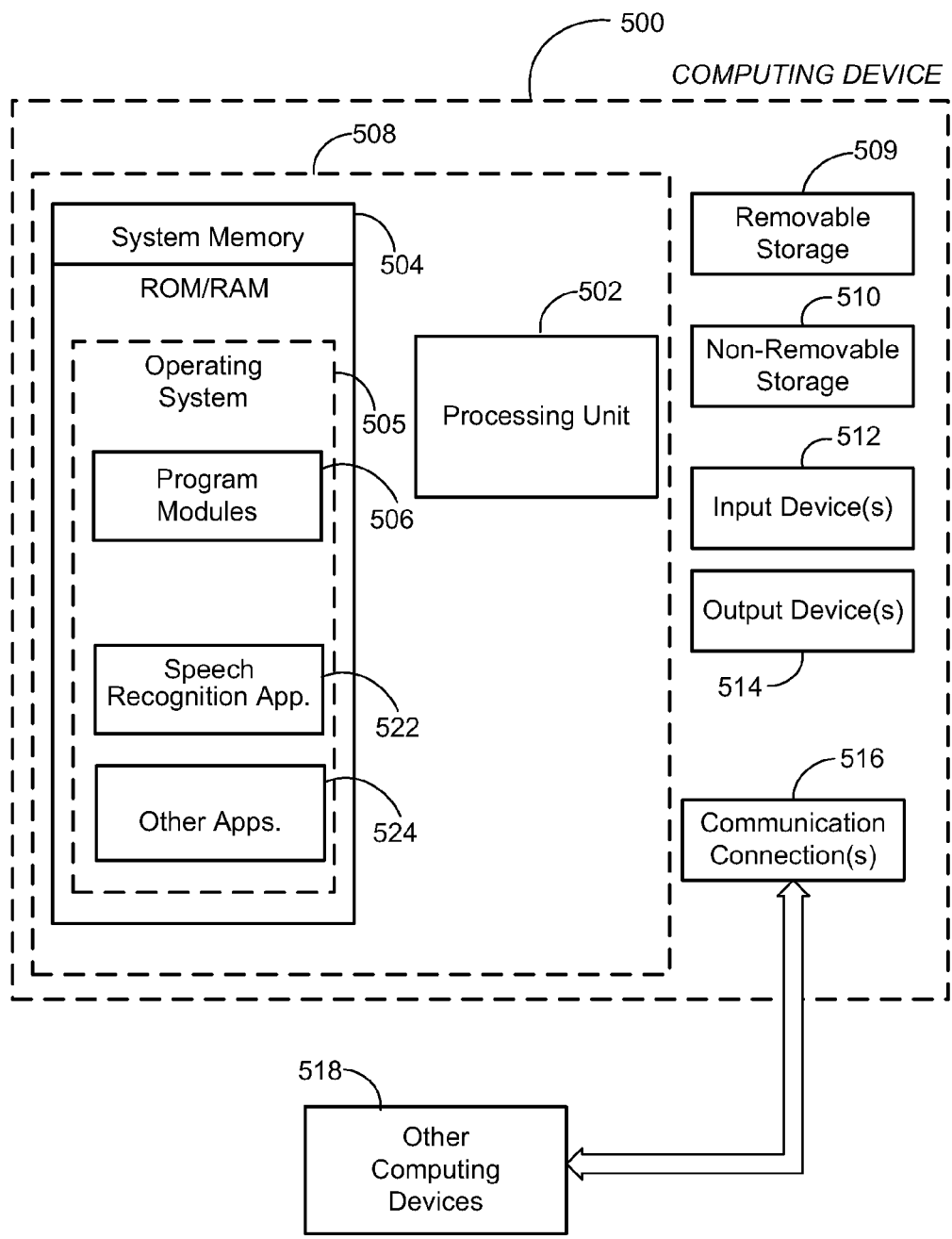
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment is illustrated, such as computing device 500. In a basic configuration, the computing device 500 may be a computer executing a speech recognition application along (in coordination) with other applications such as a web browser. Computing device 500 may typically include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the computing device, such as the WINDOWS® operating systems from MICROSOFT CORPORATION of Redmond, Wash. The system memory 504 may also include one or more software applications such as program modules 506, speech recognition application 522, and other applications 524.

Speech recognition application 522 may perform recognition tasks as discussed previously extracting semantically distinct items from a single utterance by repeatedly recognizing the same utterance using constraints provided by semantic items already recognized. Other applications 524 may be separate applications or integral modules of a hosted service application that provide a variety of services such as directory assistance, search engine functionality, and any other functionality that may require user input through speech recognition. One or more of these applications may communicate with other applications executed on other computing devices for their specific tasks or for part or all of the speech recognition process. This basic configuration is illustrated in FIG. 5 by those components within dashed line 508.

The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer storage media may include volatile and non-volatile, removable and non-removable media implemented in any method or technology for storage of information, such as computer readable instructions, data structures, program modules, or other data. System memory 504, removable storage 509 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of device 500. Computing device 500 may also have input device(s) 512 such as keyboard, mouse, pen, voice input device, touch input device, etc. Output device(s) 514 such as a display, speakers, printer, etc. may also be included. These devices are well known in the art and need not be discussed at length here.

The computing device 500 may also contain communication connections 516 that allow the device to communicate with other computing devices 518, such as over a wireless network in a distributed computing environment, for example, an intranet or the Internet. Other computing devices 518 may include client devices and servers of the network described above. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
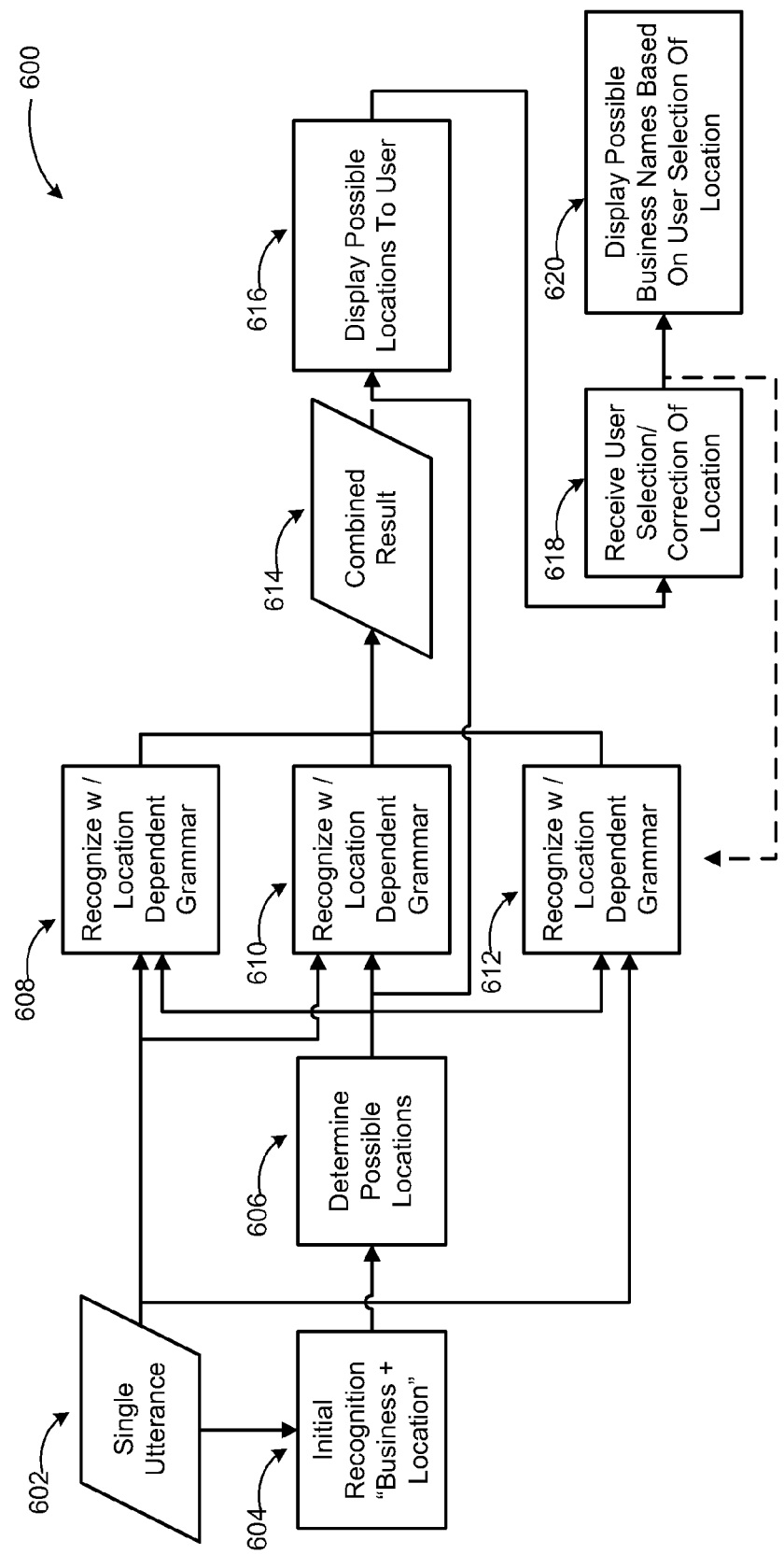
FIG. 6 illustrates a logic flow diagram for a process of recognizing semantically distinct items from a single utterance according to embodiments.

FIG. 6 illustrates a logic flow diagram for process 600 of recognizing semantically distinct items from a single utterance according to an example embodiment. Process 600 may be implemented locally in a single computing device or in a distributed manner over networked computing devices.

Process 600 begins with input operation 602, where a single utterance including semantically distinct items is received. First the single utterance is recognized in an initial recognition operation 604 determining the utterance contains two distinct parts (e.g. business and location). At following operation 606, possible recognitions of one item (location) are determined and provided to alternate operations 608, 610, and 612, where the single utterance may be re-recognized for its second item (business) using a grammar specific to the already recognized first item (location). The results may then be combined in output operation 614 and provided to an application for display to the user.

According to some embodiments, first the possible locations (first item) may be displayed to the user in operation 616, followed by receipt of user selection or correction of the location at operation 618. This selection or correction may be provided to the recognition engine for further generating constraints in re-recognizing the utterance. Then, possible business names may be displayed to the user at operation 620 based on user selection of the location.

The operations included in process 600 are for illustration purposes. Extraction of semantically distinct items from a single utterance may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for recognizing multiple semantic items from a single utterance, the method comprising:
   receiving a single utterance including at least two semantically distinct items from a user;
   performing a speech recognition operation on the single utterance to recognize a first item of the at least two semantically distinct items;
   determining a constraint based on the recognition of the first item;
   performing another speech recognition operation on the single utterance to recognize a second item of the at least two semantically distinct items based on the determined constraint, wherein performing the speech recognition operation includes obtaining a plurality of alternative values for the first item;
   providing the alternative values for the first item to the user; and
   receiving a user selection for one of the alternative values, wherein providing the alternative values to the user includes one of:
      a single step presentation that includes a combination of an alternative value for the first item and a value for the second item based on the alternative value for the first item selected according to a statistical language model; and
      a visual menu presentation that includes a listing of combinations of the alternative values for the first item and values for the second item based on the alternative values for the first item selected according to the statistical language model.

2. The method of claim 1, further comprising:
   if the semantically distinct items have a hierarchical relationship, employing the hierarchical relationship to apply the determined constraint on possible recognition values of the second item.

3. The method of claim 2, wherein applying the constraint includes selecting among a plurality of language models for recognizing the second item.

4. The method of claim 1, further comprising:
   determining the constraint based on the selected alternative value for the first item.

5. The method of claim 1, wherein the alternative values are provided to the user through one of an audio and a visual user interface presentation.

6. The method of claim 1, further comprising:
   determining another constraint based on the recognition of the second item; and
   performing a further speech recognition operation on the single utterance to recognize a third item of the at least two semantically distinct items based on the determined other constraint.

7. The method of claim 1, further comprising:
   providing the recognized first item to the user;
   receiving one of a user correction and a user confirmation for the provided first item; and
   determining the constraint based on one of the user corrected and user confirmed first item.

8. The method of claim 7, further comprising:
   performing at least one of: additional speech recognition operations and application-specific operations associated with an application consuming the recognized first and second items while the recognized first item is being provided to the user and one of the user correction and the user confirmation is received.

9. A computing device for recognizing multiple semantic items from a single utterance, the computing device comprising:
   a memory;
   a processor coupled to the memory, the processor capable of executing a first application for speech recognition and a second application for consuming results of the speech recognition, wherein the first application is configured to:
      receive a single utterance including at least two semantically distinct items from a user, the semantically distinct items comprising at least one from a set of: words, phrases, and fragments;
      process the single utterance to recognize a first item of the at least two semantically distinct items;
      provide the recognized first item to the user for one of confirmation and correction;
      receive one of the user correction and confirmation for the first item;
      determine a specific language model based on the first item;
      process the single utterance again to recognize a second item of the at least two semantically distinct items applying the specific language model;
      determine alternative values for the first item based on recognizing the first item;
      provide the alternative values to the user and the second application;
      receive input from the second application for specific language models associated with each of the alternative values;
      receive a user selection for one of the alternative values; and
      recognize the second item based on one of the specific language models associated with the selected alternative value for the first item; and
   wherein the second application is configured to:
      in response to consuming the first item, provide input to the first application for the specific language model; and
      in response to consuming the second item, provide feedback to the user based on a combination of the first and second items.

10. The computing device of claim 9, wherein the second application is one of: a browsing application, a navigational assistance application, a directory assistance application, and a search engine.

11. The computing device of claim 9, wherein at least one of the first application and the second application are executed in a distributed manner over a plurality of computing devices communicating through a network.

12. The computing device of claim 11, wherein the second application is further configured to perform at least one of: internal operations and communication operations while one of user correction and user confirmation is received.

13. The computing device of claim 9, wherein the second application is a web-based search application, the first item is a geographical location, and the second item is a business name.

14. The computing device of claim 9, wherein the first application is further configured to:
   derive a constraint from the recognition of the first item; and
   apply the constraint to the second item utilizing repeated recognitions.

15. A computer-readable storage device with computer-executable instructions stored thereon which, when executed by a computer, perform a method for recognizing multiple semantic items from a single utterance, the method comprising:
   receiving a single utterance including a plurality of semantically distinct items from a user;
   performing a plurality of speech recognition operations on the single utterance to recognize one of the plurality of semantically distinct items during each operation, wherein performing the plurality of speech recognition operations includes obtaining a plurality of alternative values for a first item in the plurality of semantically distinct items wherein the semantically distinct items are hierarchically related, and wherein a statistical language model for recognizing one of the plurality of semantically distinct items is determined based on a prior recognition during each operation;
   providing each recognized item to the user for one of confirmation and correction between recognition operations;
   upon receiving one of user correction and confirmation, providing the recognized plurality of semantically distinct items to a web-based search application;
   receiving input from the web-based search application;
   providing the received input to the user;
   determining constraints based on all alternative values for the first semantically distinct item simultaneously;
   providing the alternative values for the first semantically distinct item to the user, wherein providing the alternative values for the first semantically distinct item to the user includes one of:
   a single step presentation that includes a combination of an alternative value for the first semantically distinct item and a value for a second semantically distinct item based on the alternative value for the first semantically distinct item selected according to a statistical language model; and
   a visual menu presentation that includes a listing of combinations of the alternative values for the first semantically distinct item and values for the second semantically distinct item based on the alternative values for the first semantically distinct item selected according to the statistical language model;
   receiving a user selection for one of the alternative values; and
   employing a constraint corresponding to the selected alternative value for the first semantically distinct item in recognizing the second semantically distinct item.

16. The computer-readable storage device of claim 15, wherein the semantically distinct items include at least two from a set of: a geographical location, a business type, and a business name.

17. The computer-readable storage device of claim 15, further comprising:
   providing the selected alternative value to the web-based search application as the recognized item.

* * * * *